United States Patent
Roßkopf

(10) Patent No.: US 9,454,142 B2
(45) Date of Patent: Sep. 27, 2016

(54) METHOD FOR OPERATION OF AN AUTOMATION DEVICE

(75) Inventor: Harald Roßkopf, Pfinztal-Wöschbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1705 days.

(21) Appl. No.: 12/008,001

(22) Filed: Jan. 8, 2008

(65) Prior Publication Data

US 2008/0168393 A1 Jul. 10, 2008

(30) Foreign Application Priority Data

Jan. 9, 2007 (EP) .................................. 07000379

(51) Int. Cl.
*G05B 19/042* (2006.01)

(52) U.S. Cl.
CPC ... *G05B 19/042* (2013.01); *G05B 2219/23437* (2013.01)

(58) Field of Classification Search
CPC .... G06F 3/00; G06F 3/048; G06F 17/30882; G06F 9/4446; H04L 29/06421
USPC ........................................ 715/708, 757, 804
See application file for complete search history.

(56) References Cited

U.S. PATENT DOCUMENTS

| | | |
|---|---|---|
| 5,400,246 A | 3/1995 | Wilson et al. |
| 5,613,058 A * | 3/1997 | Koppolu et al. ............. 715/744 |
| 7,356,773 B1 * | 4/2008 | Barraclough ............. G06F 8/30 715/705 |
| 7,676,287 B2 * | 3/2010 | Eryurek et al. ................. 700/83 |
| 2002/0129004 A1 * | 9/2002 | Bassett ................. G06Q 30/02 |
| 2003/0052908 A1 * | 3/2003 | Katz et al. ..................... 345/704 |
| 2003/0195934 A1 | 10/2003 | Peterson et al. |
| 2003/0217053 A1 * | 11/2003 | Bachman et al. ................ 707/4 |
| 2004/0103072 A1 | 5/2004 | Karahashi et al. |
| 2005/0119771 A1 | 6/2005 | Amundson et al. |
| 2005/0132306 A1 * | 6/2005 | Smith ................. G06F 17/5068 716/114 |
| 2005/0154719 A1 * | 7/2005 | Choudhary et al. ............. 707/3 |
| 2005/0257204 A1 * | 11/2005 | Bryant ................. G06F 3/0481 717/163 |
| 2005/0262236 A1 | 11/2005 | Schachtely et al. |
| 2006/0129931 A1 * | 6/2006 | Simons et al. ................ 715/705 |
| 2007/0043632 A1 * | 2/2007 | Abelow .......................... 705/27 |
| 2007/0156648 A1 * | 7/2007 | Bridges et al. .................. 707/3 |

FOREIGN PATENT DOCUMENTS

| | | |
|---|---|---|
| GB | 2 404 457 A | 2/2005 |
| WO | WO 2006/108207 A1 | 10/2006 |

* cited by examiner

*Primary Examiner* — Patrick Riegler
*Assistant Examiner* — Le Nguyen

(57) ABSTRACT

A method for operation of an automation device for obtaining information about a control program provided as an automation solution for control and/or monitoring of a technical process is specified in which, especially from a database in conjunction with the control program, a list of entry point questions is loaded and presented to the user for selection and, when an entry point question is selected in the list of entry point questions in conjunction with the entry point question at least one item of dynamic information relating to the control program is loaded.

9 Claims, 2 Drawing Sheets

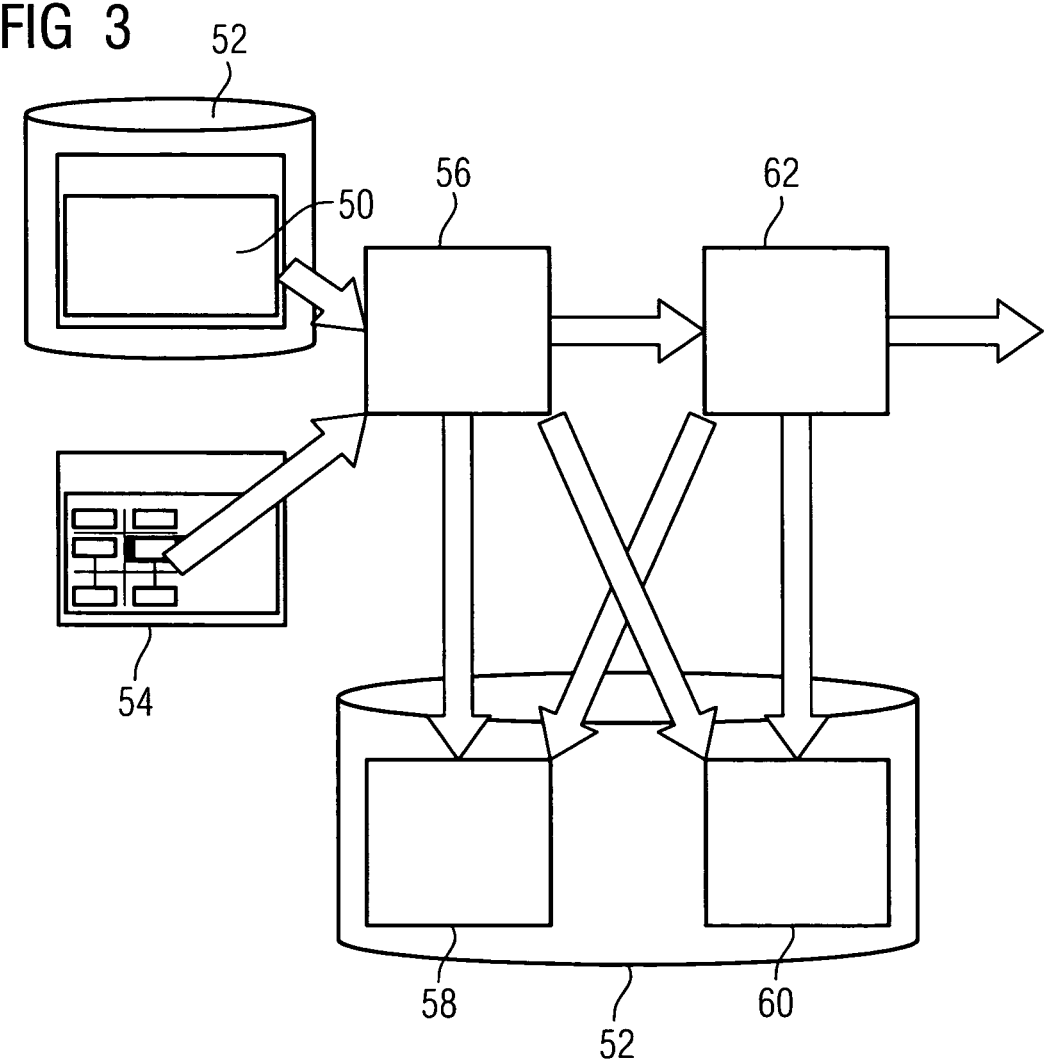

METHOD FOR OPERATION OF AN AUTOMATION DEVICE

CROSS REFERENCE TO RELATED APPLICATIONS

This application claims priority of European Patent Office application No. 07000379.3 EP filed Jan. 9, 2007, which is incorporated by reference herein in its entirety.

FIELD OF INVENTION

The present invention relates to a method for operation of an automation device for obtaining information about a control program provided as an automation solution for control and monitoring of a technical process. Automation solutions and control programs of the type mentioned at the start are generally known. This includes the terminology, which is thus also used synonymously below. Automation solutions for technical processes are constantly becoming more complex as the power of the respective automation hardware increases and with the increasing integration of individual control or automation islands into a control or automation concept for an overall installation. Accordingly aids which support a user in creating or maintaining such automation solutions are helpful.

BACKGROUND OF THE INVENTION

To support users in the area of data processing devices what are referred to as help texts have become known in the very widest range of variants. An especially simple form of such a help text consists of a computer program being called with a specific parameter which then returns a textual description of its functionality at an output device. Then, with reference to the functionality provided by the computer program, the user must look for the function and the specifics provided for it suitable for him when calling the computer program and undertake a corresponding call of the computer program. Whereas such a help function usually globally represents the complete functionality of a computer program, context-sensitive help has since become known with which the user calls the help function while working with a computer program, e.g. by actuating a particular key, whereupon the computer program, in conjunction with the functionality of the computer program currently being used by the user, outputs information about this functionality as help. A plurality of different help texts can be assigned to the computer program for this purpose, with a call of the help function in a specific processing situation being associated with precisely one help text in each case and accordingly the activation of the help function causing the corresponding help text to be displayed. With a plurality of help texts said texts can be linked to each other, e.g. via hyperlinks or such like, so that the user, if a help text initially displayed does not include the information needed, can obtain further information, if necessary by following such links, so that, by actively collecting information, a clue in relation to a solution of the respective problem might be produced.

The disadvantage of such known solutions is above all that such help texts involve static information, and although they can be maintained and modified after the creation of the respective underlying computer program, they always only geared to the knowledge horizon of the user processing the help texts. A user will thus not find any information about a problem which has not been considered when the help texts were being generated.

SUMMARY OF INVENTION

An object of the invention accordingly consists of expanding help functions of the type mentioned above so that dynamic reference can be made to the respective computer program, which is the control program in this case.

Inventively this object is achieved by a method of the above-mentioned type by a list of entry point questions being loaded especially from a database in conjunction with the control program and presented to the user for selection. The user can then select an entry from the list of entry point questions as an entry point question. In response to such a selection at least one item of dynamic information relating to the control program is loaded or generated in conjunction with the initial question and is presented to the user for viewing, further selection or such like. Dynamic information is understood here and subsequently in this document to be at least one item of data from the control program or relating to the control program.

The above method is itself a computer or control program and is accordingly implemented in software. It is either a component of the control program or is executed in parallel or alongside the control program, where necessary also on different hardware. The implementation of the method in software, i.e. at a first abstraction level the loading and presentation of the entry point question list and the access to the control program in conjunction with the entry point question selected from the list is static, whereas the entry point question list and/or the information determined from the control program in conjunction with the entry point question is dynamic, provided the method is suitable for basically any control program and e.g. the same entry point question supplies first dynamic information when applied to a first control program and supplies second dynamic information when applied to a second control program.

Also encompassed by the approach in accordance with the invention is a combination with previous approaches, e.g. such that, if a list of the variables used in the control program is returned to the user for a specific entry point question, its type is displayed for example for each variable and for explanation of different type information access to a static help text is possible.

Unlike the functionalities for user support already known as the prior art sketched out above, in which a static help program delivers static help texts, in the inventive approach the respective information obtainable is related directly to the respective control program investigated. The information obtained is thus very much more concrete for the user concerned and can accordingly explicitly contribute to the solution of the respective problem.

Further advantages and details emerge with reference to the subclaims. References back in such cases refer to the further embodiment of the subject matter of the main claim through the features of the respective subclaim; they are not to be understood as dispensing with the objective of an autonomous protection of the subject matter for the feature combinations of the referenced subclaims. Furthermore in respect of an arrangement of the claims for a more detailed specification of a feature in a subordinate claim, it is to be assumed that this type of restriction is not present in the preceding claims in each case.

There is preferably provision for an object list related as dynamic information in relation to the control program to be loaded or generated and presented to the user for selection, with a data list related to the control program being loaded or generated in response to a selection of an entry point object from the object list in conjunction with a logical combination relating to the entry point question and entry point object and presented to the user for selection. The data list obtained in this way finally comprises data which supports the user in relation to the entry point question and the entry point object in finding relationships in the control program. In this way an object list is obtainable as dynamic information for a respective entry point question which comprises the elements actually used in the control program, namely objects, i.e. software objects.

There is also preferably provision, during consideration of an item of data selected by the user from the data list as entry point object, for the method to be continued in a quasi recursive manner, in order to analyze or be able to analyze relationships in the control program more precisely.

If the entry point question or the list of entry point questions is produced on the basis of an error message, both the formulation or selection of the entry point question or of the list of entry point questions can be undertaken dynamically and the user is guided immediately to the aspects relevant for him within the support made possible by the method. There is especially preferably provision in this case for the error message to be produced as a result of plausibility checking, so that the method is also able to be used for example during creation of control programs of the above type if it is a matter of recognizing relationships and/or dependencies in complex structures of data and objects used or provided for use in the control program.

To establish the relationship between the dynamic information provided in accordance with the method and the respective control program in more concrete terms, there is also preferably provision for identifiers or such like, which are shown in the entry point object list and/or the data list, to correspond to the identifiers used in the control program. In this way elements, objects or data from the control program are directly identifiable on the basis of the objects included in the entry point object list or the data list which are related to the entry point question and the entry point object, so that these already represent actual elements of the control program and to this extent provide support in finding relationships or promote the finding of further relationships, in that these can be included as a starting point for further concretizations.

There is preferably provision for the list of entry point questions to include entry point questions on the one hand and on the other hand for each entry point question to comprise at least one entry point question parameter. The entry point question parameter maps a content of the respective entry point question, i.e. its material content, onto objects and/or data used or able to be used in the control program. Thus if the question formulated as the entry point question is for example "which objects are covered by the control program?", the result of the keywords "object" and "control program" is that the entry point question relates to the complete control program and in said program to the objects used therein. Thus all the objects instantiated in the control program are returned as a result. Other, more concrete entry point questions could be "What numbers are used in the control program?", with the keyword "number" removing from the set of overall objects used in the control program those objects which do not represent numbers, e.g. objects associated with text display and processing or such like.

In accordance with a preferred embodiment, there is provision, in respect of improved availability of the list of entry point questions for example, for this to be stored independently of the control program. In this context there is especially preferably provision for the list of entry point questions to also be able to be modified independently of the control program so that it can be updated especially easily.

There is also preferably provision for the list of entry point questions to be stored or able to be stored in both structured format and also in a format able to be read by a human user, especially XML. Such a format facilitates the maintenance or if necessary retrospective modification or expansion of the list of entry point questions for the user and simultaneously makes possible its automatic interpretation by a computer program, with which the method is implemented, in that the structure assists in the resolution of syntactical or semantic relationships and to this extent facilitates automatic evaluation.

As already mentioned the method of the type sketched out above and subsequently described in greater detail is intended for implementation in software, so that the invention also includes a computer program with program code instructions for its implementation able to be executed by a computer. The invention also relates to a computer program product, especially a memory medium, such as memory chips, diskettes or suchlike for example, with a computer program for implementing the method able to be executed by a computer.

The claims submitted with the application are proposed formulations without prejudice for obtaining further patent protection. The applicant reserves the right to claim further feature combinations previously disclosed only in the description and/or drawing.

BRIEF DESCRIPTION OF THE DRAWINGS

An exemplary embodiment of the invention is explained in more detail below based on the drawing, which is not to be understood as restricting the invention. Instead numerous alterations or modifications are possible within the framework of the current disclosure, especially such variants as are described for example through combination or variation of individual features or elements or method steps described in connection with the general or specific part of the description, as well as in the claims and/or the drawing able to be obtained by the person skilled in the art in respect of the solution of the task and which lead by combinable features to a new subject matter or to new method steps or sequences of method steps. Objects or elements which correspond are provided with the same reference symbols in all figures.

The figures show

DETAILED DESCRIPTION OF INVENTION

Figure 1:
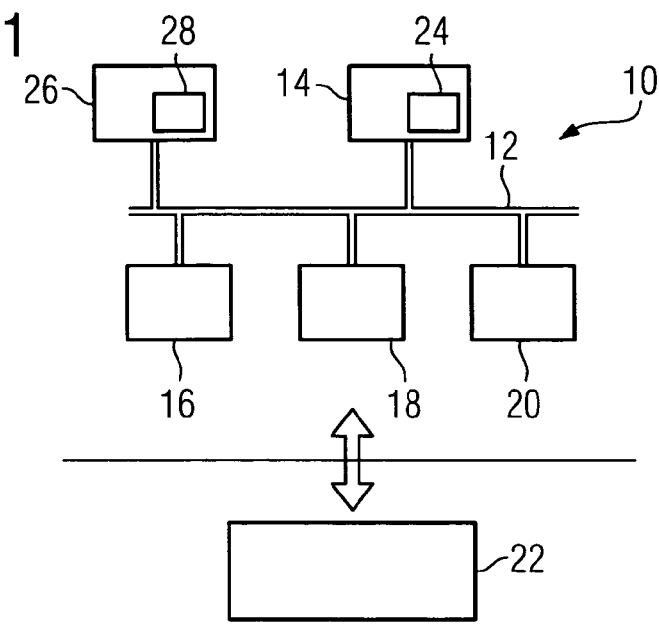
FIG. 1 an automation system for controlling and/or monitoring a technical process, FIG. 2 an exemplary presentation of a dialog, as can be produced in the application of the method in accordance with the invention and FIG. 3 a simplified schematic diagram of relationships and dependencies in the execution of the method.

FIG. 1 shows in schematically simplified form an overall automation system identified by the number 10, in which a number of automation devices 14, 16, 18, 20 connected for communication via a bus 12 are collected together, with the automation system 10 being provided to control and/or modify a technical process 22 also only depicted schematically. For this purpose a control program 24 is assigned to the automation system 10 as an automation solution for control and/or monitoring of the technical process 22, said program being executed or able to be executed by one or more of the automation devices 14, 16, 18, 20 included in the automation system 10.

The term automation device in this case includes all devices, apparatus or systems, i.e. as well as controllers for example, such as stored program controllers, process computers, (industrial) computers, decentralized peripheral devices, operation and maintenance devices and such like, also drives or other equipment controls, frequency converters and similar, as used or able to be used for open-loop control, closed-loop control and/or monitoring or technological process, e.g. for reshaping or transporting materials, energy or information etc., with energy especially being applied or converted via suitable technical devices, such as sensors or actuators for example. Also regarded as automation devices in this case are those communication users in an automation system which do not interact directly with the respective technical process, but which, for diagnosis purposes or for operation and observation functions for example, might only temporarily be a component of the automation system.

The method for operation of an automation device 14, 16, 18, 20 is preferably implemented in software and is either executed by one of the automation devices 14, 16, 18, 20 or by an operating device 26 assigned for at least part of the time to the automation system 10. A software implementation of the inventive method is also referred to as a "wizard" 28 and is depicted in simplified schematic form in a manner assigned to the operating device 26. The operating device 26 can in this case access the automation system 10 and the automation devices 14, 16, 18, 20 included in it, especially over the bus 12, so that the control program 24 can be accessed to receive dynamic information.

Further details are explained below with reference to FIG. 2 and FIG. 3.

Figure 2:
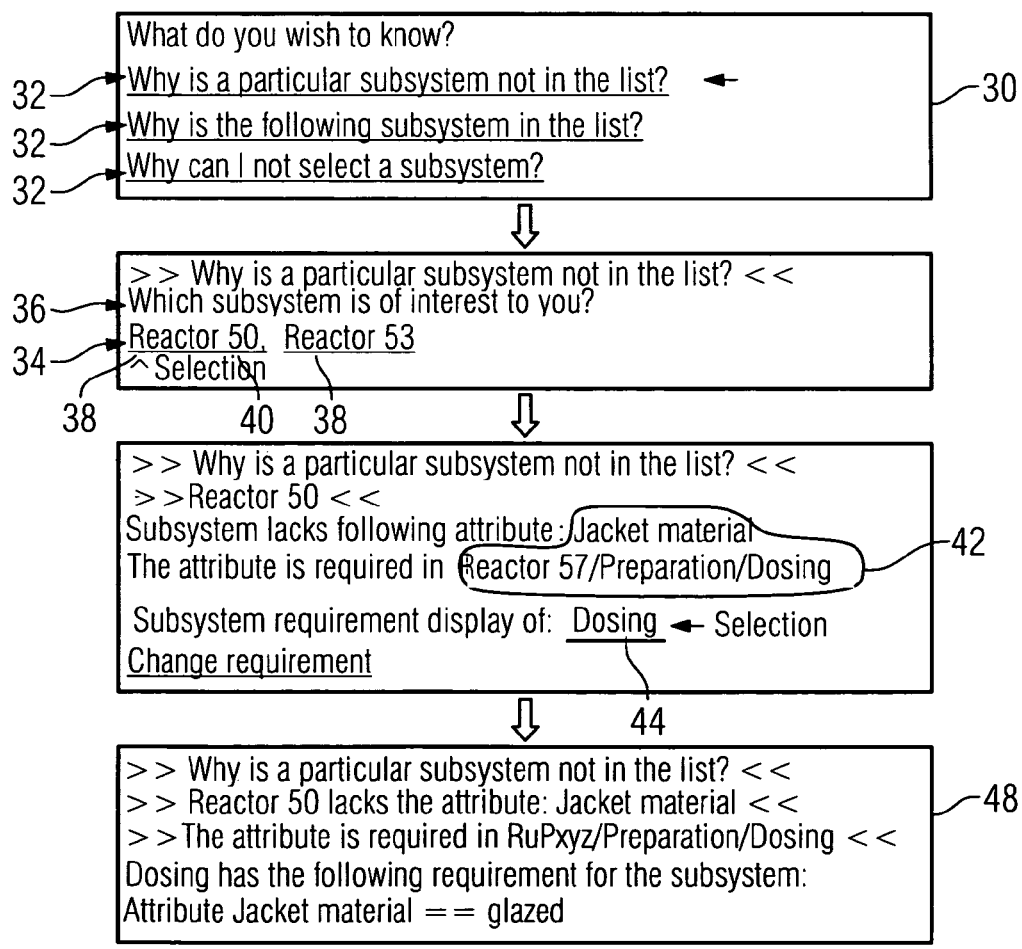

FIG. 2 shows an example of a list of entry point questions 30 with a number of entry point questions 32, including for example "Why is a particular subsystem missing from the list?", "Why is the following subsystem in the list", "Why can't I select any subsystem?", etc. The list of entry point questions 30 is presented to the user (not shown) for selection in a known manner, e.g. in a dialog on an output device such as a screen. In the example shown in FIG. 2 it is assumed that the user has selected from the list of entry point questions 30 the entry with the formulation "Why is a specific subsystem missing from the list?" as the entry point question 32. In response to this selection of entry point question 32 in the list of entry point questions 30 by the user, dynamic information relating to the control program 24 (FIG. 1) is loaded in conjunction with the respective entry point question 32. In the example shown the dynamic information comprises the list of identifiers which represent subsystems in the control program 24 and to this extent can be seen as an "answer" to the selected entry point question 32. Thus an object list 34 relating to the control program 24 is loaded or generated as dynamic information relating to the control program 24 and is presented to the user for selection. The object list 34, here "Reactor 50", "Reactor 53", can be supplemented by a heading 36, here "Which subsystem is of interest to you?", so that the information is also conveyed by the header 36 that the objects 38 included in the object list 34, i.e. "Reactor 50" or "Reactor 53", have been derived from the control program 24 under the aspect "Subsystem". On the basis of the object list 34 the user refines his information requirement by selecting one of the objects 38 included as his entry point object 40. In conjunction with a logical combination in respect of the entry point question 32 and entry point object 40, a data list 42 related to the control program 24 is loaded or generated and presented to the user for selection. The data list 42 in this case comprises data which, in relation to the entry point question 32 and the entry point object 40, supports the user in finding relationships in the control program 24.

The method can be continued in the interests of a more precise analysis of relationships in the control program 24, if an item of data 44 selected by the user from the data list 42, here "Dosing" for example, is considered as entry point object 40 or further entry point object. Within the framework of the method, by generation of a further data list 42 in conjunction with a logical combination in relation to the entry point question 32 and the further entry point object, here the data item 44 "Dosing", where nec. in relation to entry point question 32, entry point object 40 and the aforementioned further entry point object, a (further) data list related to the control program 24 is loaded or generated and presented to the user for selection, in order to analyze relationships in the control program more precisely, as is sketched out in the subsequent dialog 48 in FIG. 2.

To this end, FIG. 3 shows a schematic simplified overview to clarify execution sequences for executing the inventive method. The list of entry point questions 30 or the entry point question 32 can be produced as a result of an error message, especially an error message resulting from a plausibility check 50. The transfer of a result from the plausibility check 50 can be considered as a transfer from a database 52. The database 52, i.e. a database or any other collection of data, then comprises either a program for plausibility checking 50 or results of such a program. Likewise the control program 24 (FIG. 1) can be regarded in the widest sense as the database 52. A further consideration is to regard the list of entry point questions 30 as the database 52. Accesses to the control program 24 as database 52 can also include accesses via a so-called API interface. The list of entry point questions 30 can especially be combined with the control program 24 or associated in any other suitable manner. Of importance in connection with the starting point for the inventive method thus clarified is that this is based on dynamic data, i.e. the plausibility message 50, the modifiable and especially also replaceable control program 24 and/or the modifiable and especially also likewise replaceable with a replaced control program list of entry point questions 30 for example.

If a plausibility message 50 is provided as an entry point for the method, the cause which has lead to the plausibility message 50 i.e. the aspect on which a plausibility check has failed, usually produces at least one entry point question 32. If the user starts the method without such a plausibility message 50 or such like a list of entry point questions 30 with a plurality of entry point questions 32 is usually produced. The object list 34 related to the control program 24 (FIG. 2) is usually loaded as the dynamic information in relation to the control program 24 illustrated by the recipe window in FIG. 3. With only one entry point question 32 because of a plausibility message 50 in a first dialog 56 in conjunction with the entry point question 32 defined thereby, the object list 34 related to the control program 24 can be loaded or generated and presented to the user for selection. In conjunction with the first dialog 56 there is optional access to the database 52, which can involve the same database 52 as has already been described and which is shown again in FIG. 3 for reasons of clarity only. The database 52 thus especially includes a first dataset 58, in the form of recipe data, library data and such like for example and a second dataset 60 in the form of questions, question templates and such like. With access to these datasets 58, 60 the first dialog 56 can be refined, so that the object list 34 maps objects and/or data used or able to be used in the control program 24. With access to questions or question templates the method can be sensibly continued in that instead of a first entry point question 32 a further entry point question applies if a continuation of the method has not been selected by an object 38 selected or selectable from the object list 34 being regarded as the entry point object 40 and to this end, in a second dialog 62 in conjunction with a logical combination in relation to entry point question 32 and entry point object 40, a data list 42 related to the control program 24 is presented to the user. In this respect the method can be continued almost recursively in order to analyze relationships in the control program 24 ever more precisely.

To summarize, the method in accordance with of the present invention can be briefly presented as follows: "Wizard"-like, predetermined navigation paths, enriched by and controlled by data 30, 34, 42 in relation to the control program 24, make possible a new type of support for complex data structures. If the respective application, i.e. especially the control program 24, also makes the data available via interfaces, especially a defined format, e.g. XML, the option is also produced of project-specific or customer-specific expandability of such navigation paths. A navigation path in this context is understood to be the loading of dynamic information in relation to the control program 24 in conjunction with either an entry point question 32, an entry point object 40 or an item of data 42. Unlike known methods for user support, e.g. so-called help texts, which are referred to as "static" to distinguish them, the navigation paths corresponding to the approach in accordance with the invention are dynamic, since they are not defined by the method itself or by its implementation in software but are based fully and entirely on the respective control program 24, which is modifiable per se and in addition also replaceable at any time by another control program, or on a modifiable list of entry point questions 30 and in such a list of entry point questions 30 with entry point question parameters based on respective entry point questions 32, which maps contents of the respective entry point question 30 to objects and/or data used or useable in the respective control program 24.

The invention claimed is:

1. A method for providing dynamic user support for a plurality of control programs that are configured to monitor and/or control a plurality of respective devices of an automation system, comprising:
   (a) presenting to a user of a specific control program assigned to the automation system in a dialog box as an entry point for user support either
   (i) a list of entry point questions for selection by said user or
   (ii) a specific entry point question in response to an error corresponding to an aspect of the error,
   wherein each entry point question comprises one or more keywords,
   wherein the keywords are mapped to respective control programs of the plurality of control programs for the devices of the automation system to correspond to objects and data of the respective control programs representing actual elements of the respective control programs, such that the mapping provides specific dynamic information to be presented when applied to the specific control program and different dynamic information to be presented when applied to a different control program of the plurality of control programs;
   (b) responsive to a selection of an entry point question from (a), presenting to said user an object list derived from the keywords in the entry point question, wherein the object list comprises specific dynamic information related to the specific control program assigned to the automation system in response to the keywords in the entry point question, wherein
   identifiers shown in the object list correspond to identifiers used in the plurality of control programs for the devices of the automation system;
   (c) receiving an entry point object selected by said user from the object list; and
   (d) presenting to said user at least one item of data as help text specifically related to the specific control program assigned to the automation system based on a logical combination of the entry point question and the entry point object selected by said user wherein in (a) the dialog box presents an entry point question representative of a first question that asks why a subsystem is not included in a first list of devices, wherein in (b) the presenting to said user of the object list is derived from the keywords in the entry point question corresponding to the first question selected by the user, wherein the object list displays at least one device of the automation system that is not included in the first list, wherein the entry point object selected in (c) corresponds to the at least one device that is not included in the first list, wherein the item of data presented in (d) represents a reason associated with the at least one device that prevents the at least one device from being included in the first list.

2. The method as claimed in claim 1, wherein the specific control program assigned to the automation system is for a technical process that is controlled and/or monitored via the devices of the automation system, further comprising controlling and/or monitoring the technical process with devices of the automation system and the plurality of control programs.

3. The method as claimed in claim 1, wherein the data support said user in finding relationships in the control program.

4. The method as claimed in claim 1, wherein the dialog box in (a) presents the specific entry point question in response to the error, further comprising:
   presenting an error message for the error responsive to a result of a plausibility check carried out on at least one of the devices of the automation system.

5. The method as claimed in claim 1, wherein the list of entry point questions is stored independently of the specific control program.

6. The method as claimed in claim 1, wherein the list of entry point questions is modifiable independently of the specific control program.

7. The method as claimed in claim 1, wherein the list of entry point questions is stored both in a structured format and also in a format readable by a human user.

8. The method as claimed in claim 1, wherein the list of entry point questions is stored in a XML format.

9. A non-transitory computer readable medium encoded with software for providing dynamic user support for a plurality of control programs that are configured to monitor and/or control a plurality of respective devices of an automation system, comprising:

(a) presenting to a user of a specific control program assigned to the automation system in a dialog box as an entry point for user support either
(i) a list of entry point questions for selection by said user or
(ii) a specific entry point question in response to an error corresponding to an aspect of the error,
wherein each entry point question comprises one or more keywords,
wherein the keywords are mapped to respective control programs of the plurality of control programs for the devices of the automation system to correspond to objects and data of the respective control programs representing actual elements of the respective control programs, such that the mapping provides specific dynamic information to be presented when applied to the specific control program and different dynamic information to be presented when applied to a different control program;
(b) responsive to a selection of an entry point question from (a), presenting to said user an object list derived from the keywords in the entry point question, wherein the object list comprises specific dynamic information related to the specific control program in response to the keywords in the entry point question, wherein identifiers shown in the object list correspond to identifiers used in the plurality of control programs for the devices of the automation system;
(c) receiving an entry point object selected by said user from the object list; and
(d) presenting to said user at least one item of data as help text specifically related to the specific control program assigned to the automation system based on a logical combination of the entry point question and the entry point object selected by said user wherein in (a) the dialog box presents an entry point question representative of a first question that asks why a subsystem is not included in a first list of devices, wherein in (b) the presenting to said user of the object list is derived from the keywords in the entry point question corresponding to the first question selected by the user, wherein the object list displays at least one device of the automation system that is not included in the first list, wherein the entry point object selected in (c) corresponds to the at least one device that is not included in the first list, wherein the item of data presented in (d) represents a reason associated with the at least one device that prevents the at least one device from being included in the first list.

* * * * *